United States Patent
Valencia-Estrada et al.

(10) Patent No.: US 11,789,191 B2
(45) Date of Patent: Oct. 17, 2023

(54) COMMUNICATION SYSTEM COMPRISING AN OPTICAL FIBER ASSEMBLY, A MODULATED LIGHT SIGNAL RECEIVER AND A TELESCOPE

(71) Applicant: OLEDCOMM, Vélizy-Villacoublay (FR)

(72) Inventors: Juan Camilo Valencia-Estrada, Vélizy-Villacoublay (FR); Jorge Garcia-Marquez, Montigny le Bretonneux (FR); Alejandro Espinoza-Garcia, Plaisir (FR)

(73) Assignee: OLEDCOMM, Velizy-Villacoublay (FR)

( * ) Notice: Subject to any disclaimer, the term of this patent is extended or adjusted under 35 U.S.C. 154(b) by 232 days.

(21) Appl. No.: 17/599,427

(22) PCT Filed: Mar. 24, 2020

(86) PCT No.: PCT/EP2020/058217
§ 371 (c)(1),
(2) Date: Sep. 28, 2021

(87) PCT Pub. No.: WO2020/200930
PCT Pub. Date: Oct. 8, 2020

(65) Prior Publication Data
US 2022/0035087 A1    Feb. 3, 2022

(30) Foreign Application Priority Data
Mar. 29, 2019 (FR) ...................................... 1903381

(51) Int. Cl.
*F21V 8/00* (2006.01)
*G02B 6/43* (2006.01)
(Continued)

(52) U.S. Cl.
CPC ............ *G02B 6/0008* (2013.01); *G02B 6/43* (2013.01); *G02B 19/0009* (2013.01);
(Continued)

(58) Field of Classification Search
CPC .... G02B 6/0008; G02B 6/43; G02B 19/0009; H04B 10/116; H04B 10/25; H04B 10/50; H04B 10/60
(Continued)

(56) References Cited

U.S. PATENT DOCUMENTS

| 5,602,668 A | 2/1997 | Kuchta |
| 6,731,878 B1 * | 5/2004 | Britz ................. H04B 10/1121 398/118 |

(Continued)

FOREIGN PATENT DOCUMENTS

| CN | 101266321 A | 9/2008 |
| CN | 101271178 A | 9/2008 |

(Continued)

OTHER PUBLICATIONS

International Search Report as issued in International Patent Application No. PCT/EP2020/058217, dated May 28, 2020.
(Continued)

*Primary Examiner* — Dalzid E Singh
(74) *Attorney, Agent, or Firm* — Pillsbury Winthrop Shaw Pittman LLP

(57) ABSTRACT

A system includes an optical fiber assembly, a receiver and a telescope, the receiver being positioned at a receiving end of the optical fiber assembly, the telescope being positioned at a collecting end, the receiver being arranged to receive uplink modulated light signals collected by the telescope and travelling through the optical fiber assembly, the telescope comprising an optical concentrator having an inlet face and an outlet face with a surface area smaller than that of the (Continued)

inlet face, the telescope further including a gradient-index lens dispose d coaxially with respect to the optical concentrator so that an inlet face of the gradient-index lens extends opposite the outlet face of the optical concentrator, the collecting end of the optical fiber assembly opening out opposite an outlet face of the gradient-index lens.

9 Claims, 7 Drawing Sheets

(51) Int. Cl.
- G02B 19/00 (2006.01)
- H04B 10/116 (2013.01)
- H04B 10/25 (2013.01)
- H04B 10/50 (2013.01)
- H04B 10/60 (2013.01)

(52) U.S. Cl.
CPC ........... H04B 10/116 (2013.01); H04B 10/25 (2013.01); H04B 10/50 (2013.01); H04B 10/60 (2013.01)

(58) Field of Classification Search
USPC ........................................................ 398/118
See application file for complete search history.

(56) References Cited

U.S. PATENT DOCUMENTS

| | | | |
|---|---|---|---|
| 6,965,713 B2* | 11/2005 | Sidorovich | G02B 6/14 385/32 |
| 7,495,774 B2* | 2/2009 | Hays | G01N 21/47 356/519 |
| 8,629,975 B1* | 1/2014 | Dierking | G01S 17/90 359/364 |
| 2003/0011850 A1* | 1/2003 | Sidorovich | G02B 27/48 398/126 |
| 2015/0341113 A1 | 11/2015 | Krug | |
| 2021/0195720 A1* | 6/2021 | Delame | H04W 4/42 |

FOREIGN PATENT DOCUMENTS

| | | |
|---|---|---|
| CN | 101446668 A | 6/2009 |
| CN | 107450133 A | 12/2017 |
| WO | WO 00/25163 A1 | 5/2000 |

OTHER PUBLICATIONS

Zhou, G., et al., "Design of Plastic Optical Fiber Coupling system based on GRIN Lens for Enlarging the Field-of-View of VLC System," 2017 Asia Communications and Photonics Conference (ACP), Nov. 2017, pp. 1-3.

* cited by examiner

COMMUNICATION SYSTEM COMPRISING AN OPTICAL FIBER ASSEMBLY, A MODULATED LIGHT SIGNAL RECEIVER AND A TELESCOPE

CROSS-REFERENCE TO RELATED APPLICATIONS

This application is the U.S. National Stage of PCT/EP2020/058217, filed Mar. 24, 2020, which in turn claims priority to French patent application number 1903381 filed Mar. 29, 2019. The content of these applications are incorporated herein by reference in their entireties.

The invention concerns the field of communication systems comprising an optical fiber assembly and a receiver of modulated light signals.

BACKGROUND OF THE INVENTION

Communication systems are known that include a light-transmitting diode lamp (here called LED lamp) and implement a technology called "VLC" (for Visible Light Communication). Such a communication system allows both to illuminate the environment of the LED lamp, and to transmit and receive modulated light signals to allow wireless communication between the communication system and an electronic device located near the LED lamp.

In this type of communication system, electrical wires are required to carry power currents to the LED lamp to drive the components with which the LED lamp is equipped. These components include a visible light transmitter (including one or more LED(s)), a modulated light signal transmitter (including one or more LED(s)), a modulated light signal receiver (including, for example, one or more photodiode(s)).

But in some environments, these electrical wires are very problematic.

It is known, for example, that some aircraft manufacturers are seeking to install such communication systems in aircraft cabins, so as to illuminate passengers and create communication networks using VLC technology and including passengers' electronic devices.

These communication networks allow passengers not only to access various multimedia data in a simple and convenient way, but also, possibly, to access the Internet. VLC technology is particularly interesting in the aircraft cabin environment because, unlike radio communication technologies, VLC technology does not generate electromagnetic interference and does not encounter frequency spectrum availability problems.

However, any electrical equipment installed in an aircraft must comply with particularly stringent standards regarding transmissions and susceptibility to radio frequencies.

But electrical wires tend to transmit radio frequencies, making the electrical equipments they connect susceptible to radio frequencies. The number and length of electrical wires required to light all passengers and give them access to VLC technology make it very complex to integrate a communication system using VLC technology into the cabin.

SUBJECT OF THE INVENTION

The invention relates to a communication system using VLC technology, wherein the length of electrical wires is reduced and the reception of modulated light signals is optimized.

SUMMARY OF THE INVENTION

In order to achieve this goal, a communication system is proposed comprising an optical fiber assembly, a modulated light signal receiver and a telescope, the modulated light signal receiver being positioned at a receiving end of the optical fiber assembly, the telescope being positioned at a collecting end of the optical fiber assembly, the modulated light signal receiver being arranged to receive uplink modulated light signals collected by the telescope and travelling in the optical fiber assembly, the telescope comprising an optical concentrator having an inlet face and an outlet face with a surface area smaller than that of the inlet face, the telescope further comprising a gradient-index lens arranged with respect to the optical concentrator so that an inlet face of the gradient-index lens extends opposite the outlet face of the optical concentrator, the collecting end of the optical fiber assembly opening out opposite an outlet face of the gradient-index lens.

In the communication system according to the invention, the receiver of modulated light signals is separated by an optical fiber assembly from the telescope that collects the uplink modulated light signals.

This optical fiber assembly can have a relatively long length and replaces electrical wires with equivalent lengths.

The telescope allows to collect very efficiently incident light rays, and thus to improve the reception of uplink modulated light signals transmitted by an transmission device located near the telescope.

The invention will be better understood in light of the following description of particular non-limiting embodiments of the invention.

BRIEF DESCRIPTION OF THE DRAWINGS

Reference will be made to the attached drawings, among which.

DETAILED DESCRIPTION OF THE INVENTION

Figure 1:
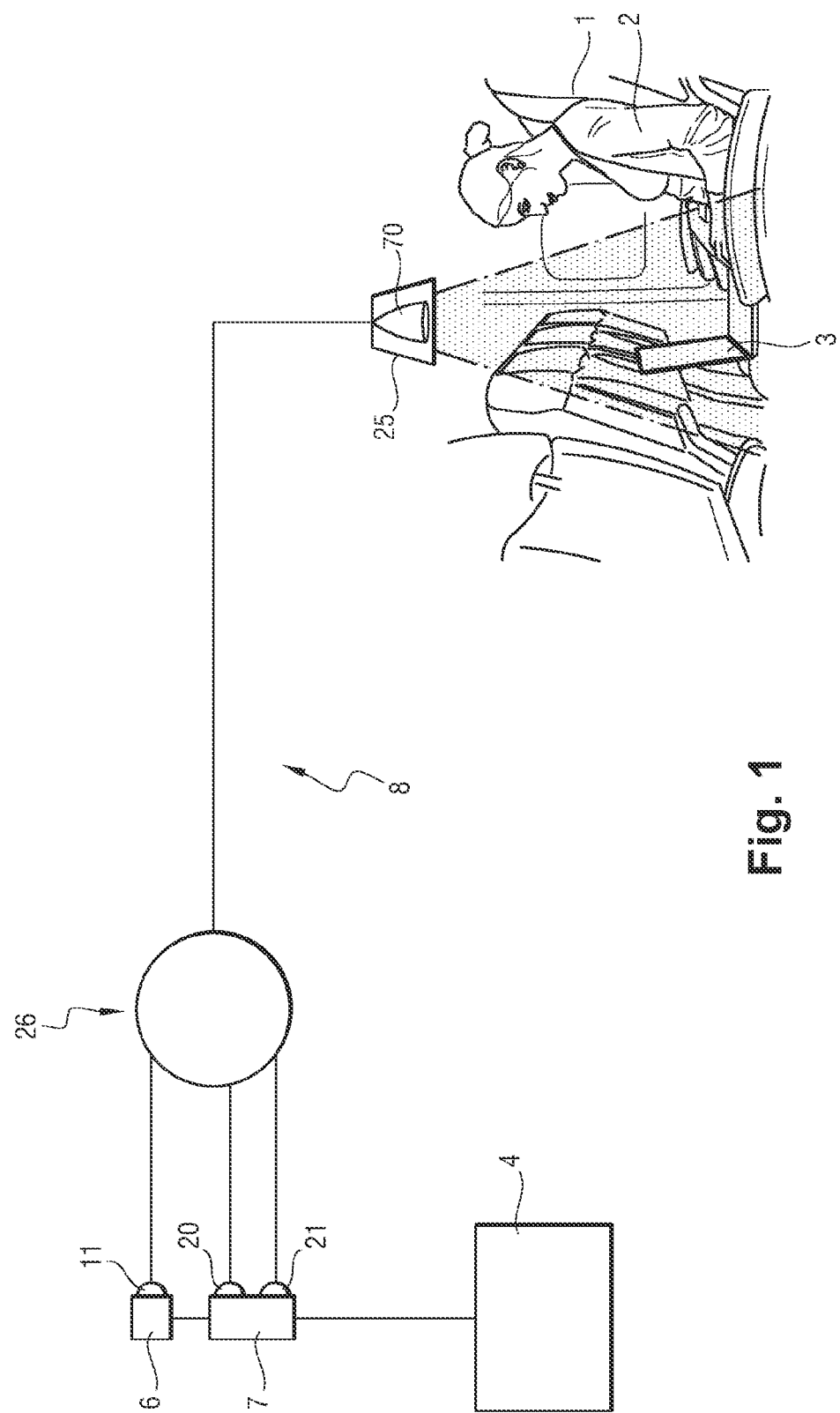
FIG. 1 shows a communication system according to a first embodiment of the invention.
Figure 2:
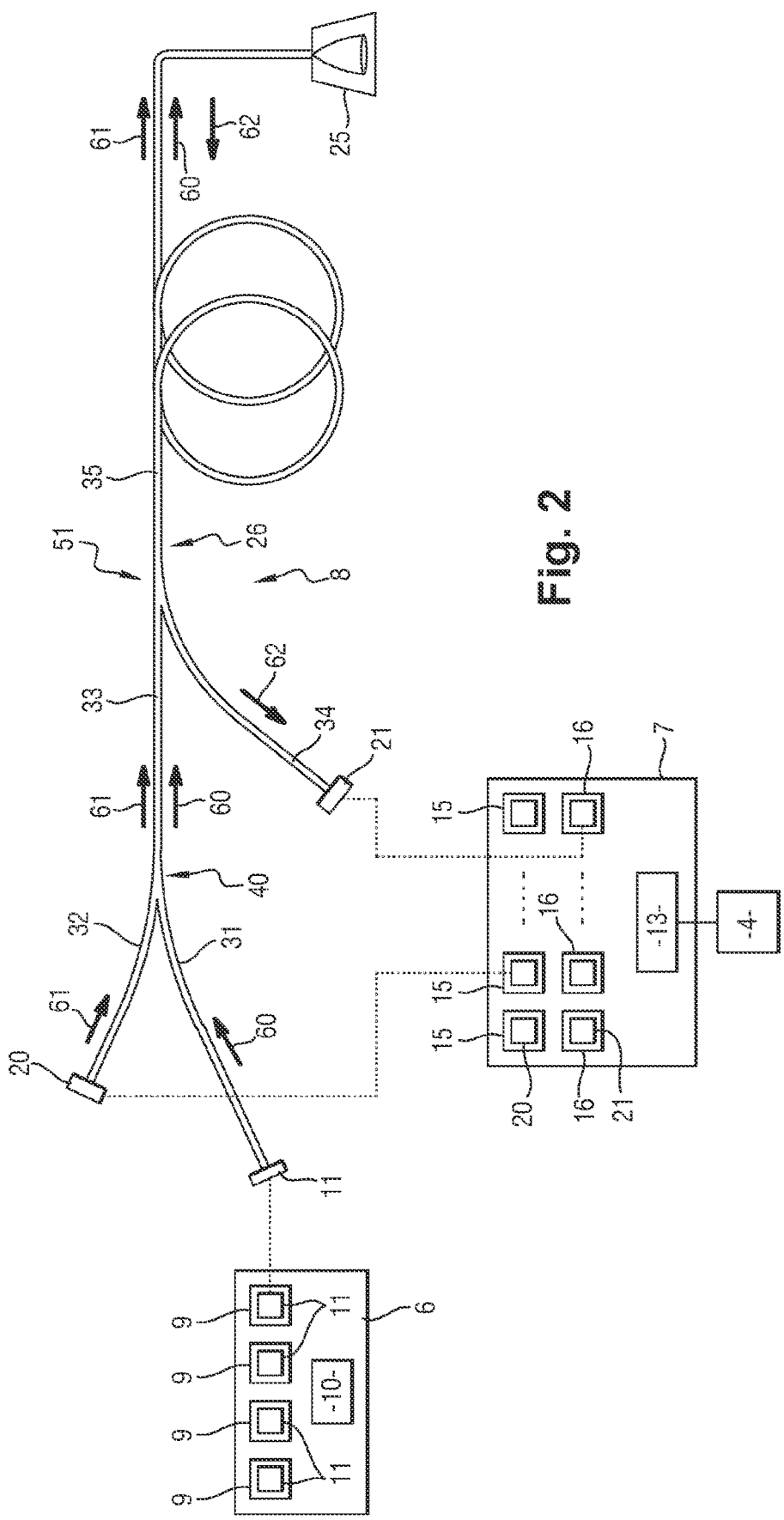
FIG. 2 shows the communication system according to the first embodiment of the invention.
Figure 3:
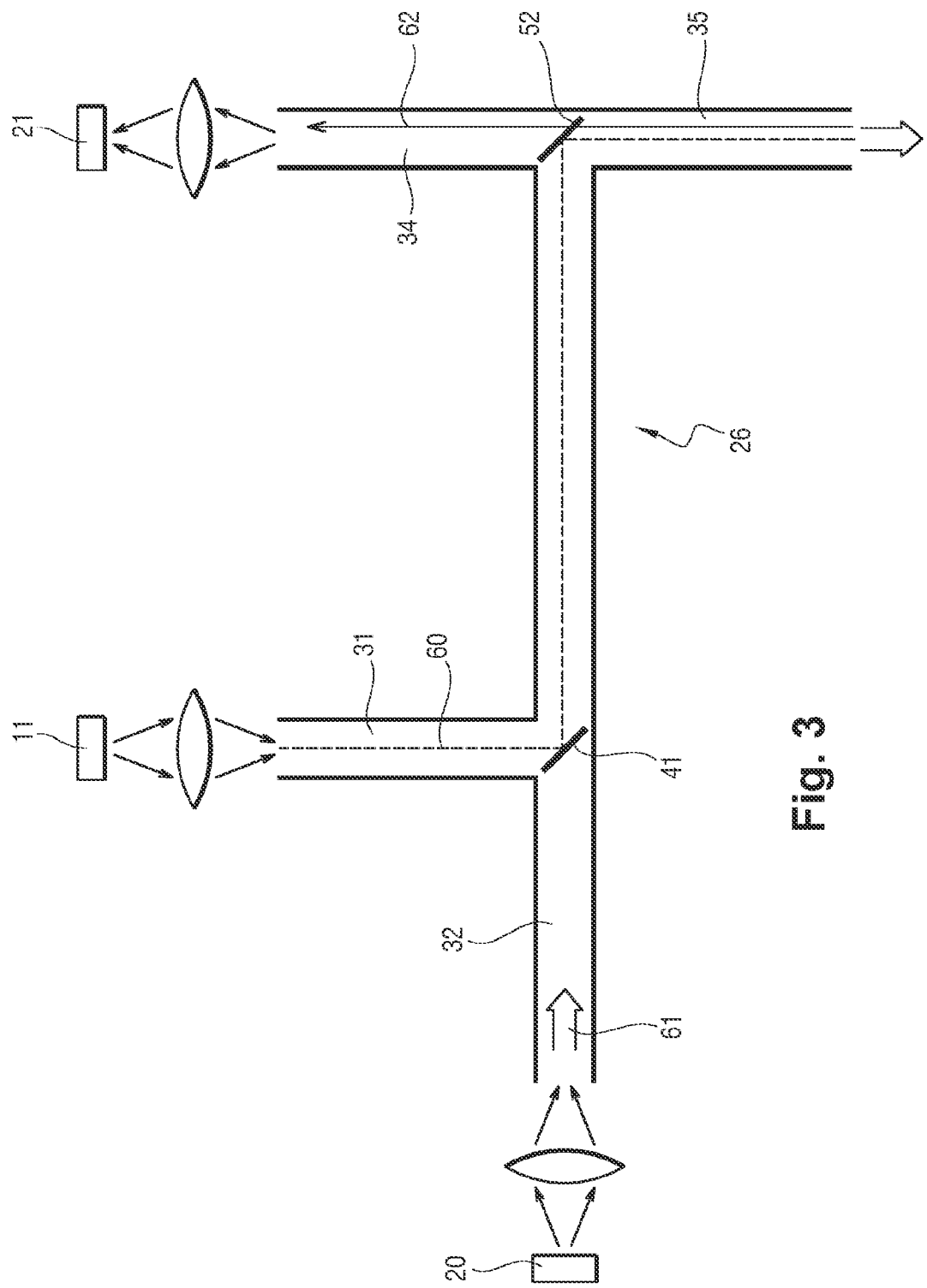
FIG. 3 is a schematic and functional view similar to that of FIG. 2, showing a first dichroic filter and a second dichroic filter.
Figure 4:
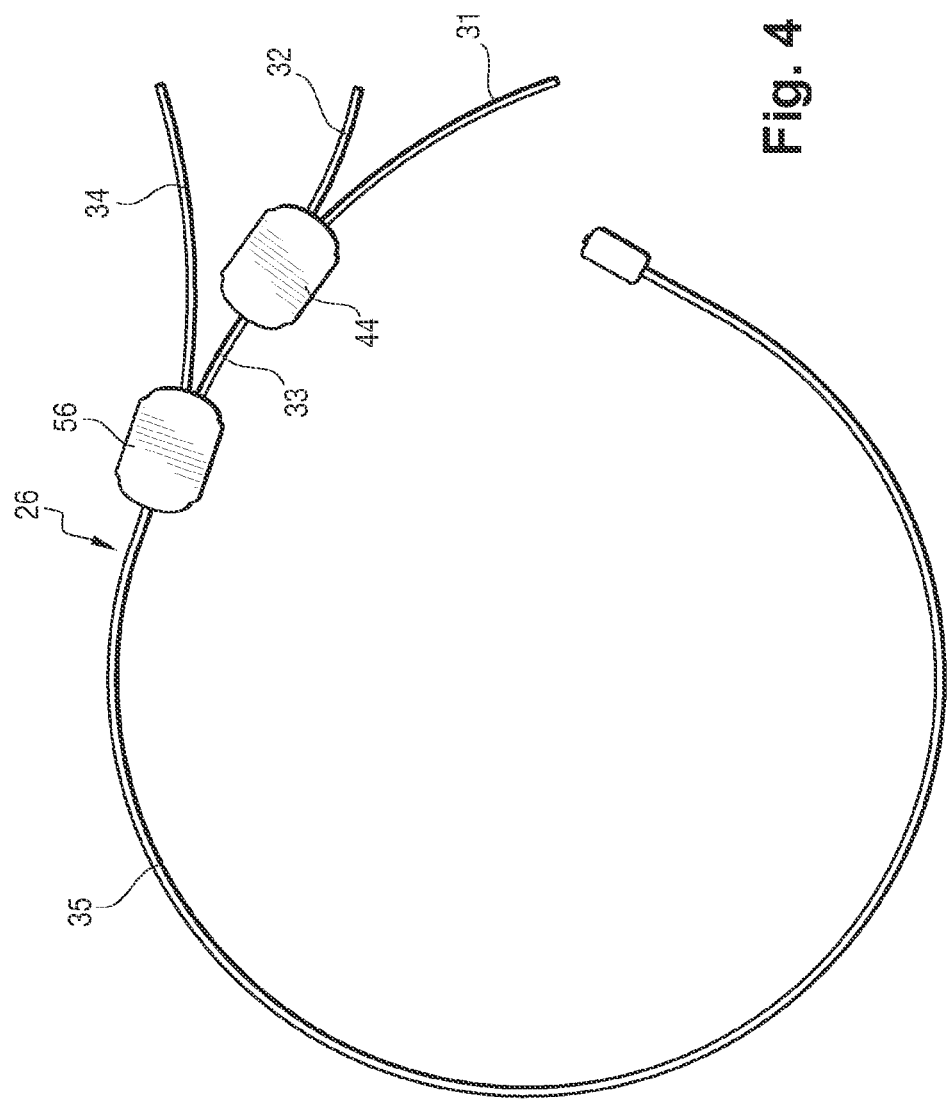
FIG. 4 shows an optical fiber assembly of the communication system according to the first embodiment of the invention.

With reference to FIGS. 1 to 4, the invention is here implemented in an aircraft cabin. The aircraft cabin comprises a plurality of seats 1 each intended to accommodate a passenger 2. Each passenger 2 thus has a personal space. Each passenger 2 is possibly equipped with an electronic device 3, which is for example a laptop, a smartphone, a tablet, a connected watch, etc.

The communication system according to a first embodiment of the invention is intended to illuminate each passenger 2, and to implement a VLC technology to allow each passenger 2 to communicate, through their electronic device 3, with a computer terminal 4 of the aircraft. Each passenger 2 can thus access various multimedia data stored in the computer terminal 4, and can also access the Internet via the computer terminal 4.

To communicate with the aircraft's computer terminal 4, the passenger's electronic device 3 must be equipped with a VLC transmitting and receiving device. The VLC transmitting and receiving device is either directly integrated into the electronic device 3 or is connected to the electronic device 3. The VLC transmitting and receiving device is thus, for example, a dangle connected to the electronic device 3, possibly via a USB port of the electronic device 3.

The lighting and communication system here comprises a centralized lighting module 6, a centralized communication module 7, and a plurality of lighting devices 8, each lighting device 8 being associated with a personal space.

The centralized lighting module 6 includes visible light transmitters 9, each visible light transmitter 9 being associated with a personal space, and control components 10. Each visible light transmitter 9 comprises a first light transmitting diode (LED) 11.

When it is necessary to illuminate a personal space of a passenger 2, the control components 10 generate a supply current to the first LED 11 of the visible light transmitter 9 associated with the personal space. The first LED 11 generates light from the supply current, the spectrum of which is contained in the visible range.

The centralized communication module 7 comprises a modem 13, and a plurality of modulated light signal transmitters 15 and modulated light signal receivers 16, a pair of one modulated light signal transmitter 15 and one modulated light signal receiver 16 being associated with a personal space of a passenger 2.

The modem 13 is electrically connected to the modulated light signal transmitters 15 and the modulated light signal receivers 16.

The modem 13 is also electrically connected to the aircraft's computer terminal 4, for example via an Ethernet cable.

Each modulated light transmitter 15 includes a second LED 20. The second LEDs 20 produce light with a spectrum in the infrared range.

Each modulated light signal receiver 16 comprises a photodiode 21. The photodiode 21 is here an avalanche photodiode, sensitive to light whose spectrum is contained in the infrared range.

When a communication is established between the computer terminal 4 and a personal space VLC transmitting and receiving device, the modem 13 acquires downlink data from the computer terminal 4, The modem 13 produces a supply current to the second LED 20 of the corresponding modulated light signal transmitter 15. The power supply current switches the second LED 20, so as to switch a light power produced by the second LED 20 to generate downlink modulated light signals to the VLC transmitting and receiving device of the personal space, said downlink modulated light signals containing the downlink data.

Similarly, the photodiode 21 of the corresponding modulated light signal receiver 16 receives uplink modulated light signals from the VLC transmitting and receiving device of the electronic device 3 of the passenger 2 of the personal space. The photodiode 21 converts the uplink modulated light signals into electrical signals containing uplink data.

The modem 13 acquires the electrical signals containing the uplink data.

The modem 13 thus receives all the uplink and downlink data exchanged between the computer terminal 4 and the electronic devices 3 of the passengers 2, and formats these data to make them compatible, on the one hand, with the second LEDs 20, and on the other hand, with the receivers of computer terminal 4.

We note here that the centralized lighting module 6 and the centralized communication module 7 can be arranged on one or more electrical boards, distinct or not, positioned in the same box or in several boxes. The boxes can be close together or, on the contrary, far apart, and be located in the cabin or in any other place inside the aircraft.

Each lighting device 8 comprises a light diffuser 25 and an optical fiber assembly 26.

The light diffuser 25 extends over the personal space of a passenger 2 and provides both illumination of the personal space and an exchange of modulated uplink and downlink light signals with the VLC transmitting and receiving device of the passenger 2's electronic device 3. The light diffuser 25 thus acts both as a lamp lens, and as an uplink light injector into the optical fiber assembly 26.

The optical fiber assembly 26 includes a first optical fiber portion 31, a second optical fiber portion 32, a third optical fiber portion 33, a fourth optical fiber portion 34 and a fifth optical fiber portion 35.

A visible light transmitter 9 is positioned at a first end of the first optical fiber portion 31. More specifically, the first end of the first optical fiber portion 31 and a first LED 11 extend opposite each other and are optically coupled via a lens. The first end of the first optical fiber portion 31 will also be referred to as the "lighting end".

A modulated light signal transmitter 15 is positioned at a first end of the second optical fiber portion 32. More specifically, the first end of the second optical fiber portion 32 and a second LED 20 extend opposite each other and are optically coupled via a lens. The first end of the second optical fiber portion 32 will also be referred to as the "transmitting end".

A second end of the first optical fiber portion 31 and a second end of the second optical fiber portion 32 are coupled and connected, at a first connection area 40, to a first end of the third optical fiber portion 33. The coupling is performed according to a conventional method of optical fiber coupling.

The second end of the first portion of optical fiber 31 and the second end of the second portion of optical fiber 32 are therefore joined in the first connection area 40 to open at the first end of the third portion of optical fiber 33.

The second end of the first optical fiber portion 31 the second end of the second optical fiber portion 32 and the first end of the third optical fiber portion 33 thus form a first coupler 2×1.

A first dichroic filter 41 is integrated into the first connection area 40. The first dichroic filter 41 is made of a large amount of thin layers. The first dichroic filter 41 extends into a section of the second end of the second optical fiber portion 32, slightly upstream of the contact area between the second end of the first optical fiber portion 31 and the second end of the second optical fiber portion 32. By "upstream" is meant on the side of a LED or photodiode and not on the side of the light diffuser 25.

Figure 5:
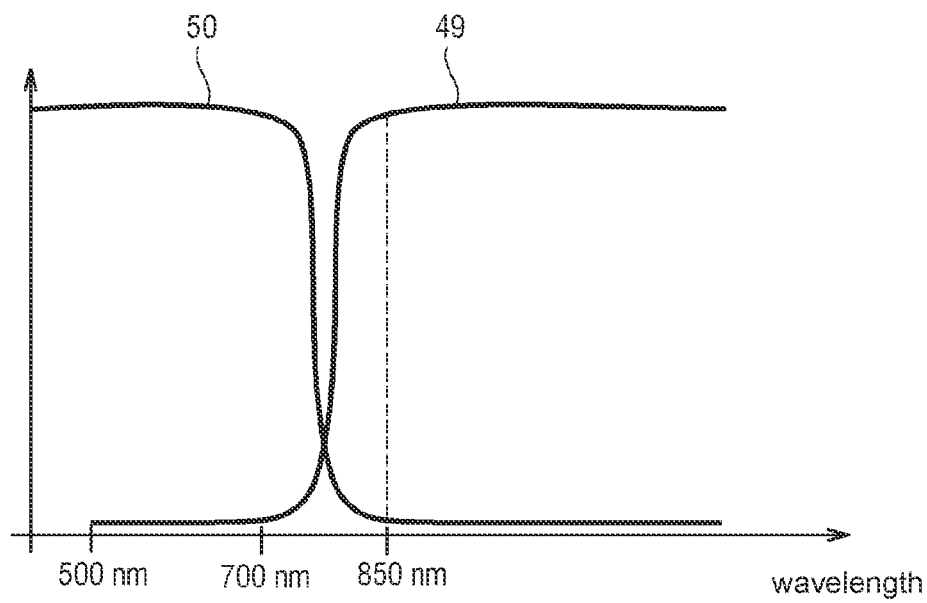
FIG. 5 is a graph showing a transmittance curve and a reflectance curve of the first dichroic filter.

The transmittance curve 49 and reflectance curve 50 of the first dichroic filter 41 are shown in FIG. 5.

It can be seen that the first dichroic filter 41 allows light signals with a wavelength greater than or equal to 850 nm to pass and reflects those with a wavelength less than or equal to 700 nm.

The role of the first dichroic filter 41 is to avoid light returns in the second portion of optical fiber 32, and therefore losses on the first portion of optical fiber 31.

The first connection area 40 is integrated into a first housing 44 of a first multiplexer.

A modulated light signal receiver 16 is positioned at a first end of the fourth optical fiber portion 34. More specifically, the first end of the fourth optical fiber portion 34 and a photodiode 21 extend opposite each other and are optically coupled via a lens. The first end of the fourth optical fiber portion 34 will also be referred to as the "receiving end".

A second end of the third optical fiber portion 33 and a second end of the fourth optical fiber portion 34 are coupled and connected at a second connection area 51 to a first end of the fifth optical fiber portion 35. The coupling is again performed in a conventional optical fiber coupling method.

The second end of the third optical fiber portion 33 and the second end of the fourth optical fiber portion 34 meet in the second connection area 51 to open at the first end of the fifth optical fiber portion 35.

The second end of the third optical fiber portion 33, the second end of the fourth optical fiber portion 34 and the first end of the fifth optical fiber portion 35 thus form a second coupler 2×1.

A second dichroic filter 52 is integrated into the second connection area 51. The second dichroic filter 52 is made of a large amount of thin layers. The second dichroic filter 52 extends into a section of the second end of the fourth optical fiber portion 34, slightly upstream of the contact area between the second end of the third optical fiber portion 33 and the second end of the fourth optical fiber portion 34.

Figure 6:
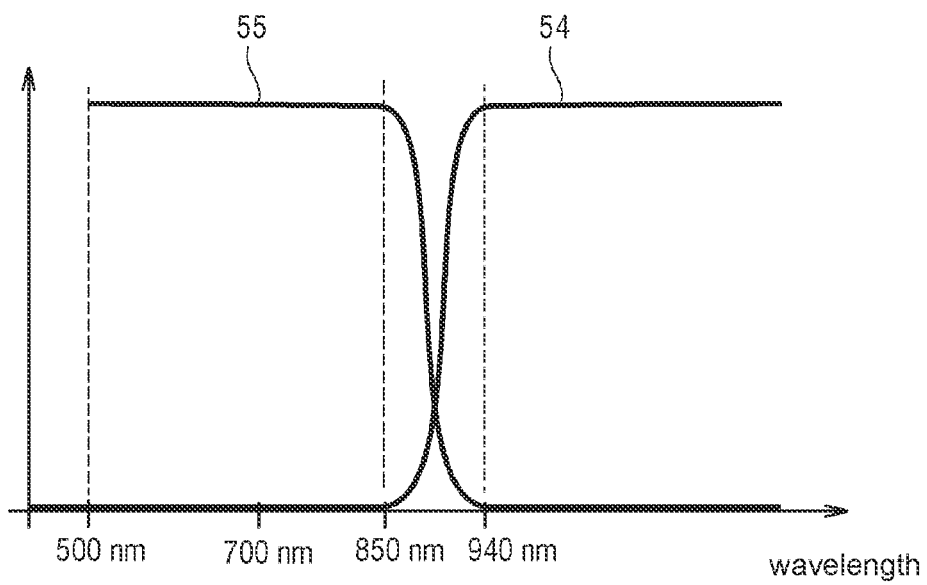
FIG. 6 is a graph showing a transmittance curve and a reflectance curve of the second dichroic filter.

The transmittance curve 54 and the reflectance curve 55 of the second dichroic filter 52 are shown in FIG. 6.

It can be seen that the second dichroic filter 52 allows light signals with a wavelength greater than or equal to 940 nm to pass and reflects those with a wavelength less than or equal to 850 nm.

The role of the second dichroic filter 52 is to separate the different wavelengths.

The second connection area 51 is integrated in a second housing 56 of a second multiplexer.

It is noted that the diameter of each fiber portion doesn't matter, and could for example be between 0.2 mm and 3 mm. The fiber portions can be made of glass or plastic or any other material.

It is noted here that the first optical fiber portion 31, intended for lighting, is a multimode fiber, that the second optical fiber portion 32, intended for data transmission, can also be a multimode fiber, and that the third optical fiber portion 33 is therefore also a multimode fiber. This is also true for the fourth optical fiber portion 34 and the fifth optical fiber portion 35.

The communication and lighting system works as follows for each personal space.

A first LED 11 produces visible light 60. The visible light 60 propagates through the first fiber portion 31, is reflected by the first dichroic filter 41, which prevents the visible light 60 from propagating through the second optical fiber portion 32.

The second dichroic filter 52 allows visible light 60 to pass downward, which propagates through the fifth optical fiber portion 35. The second end of the fifth optical fiber portion 35 opens to the outside of the optical fiber assembly 26, in this case into the light diffuser 25. Visible light is transmitted through the second end of the fifth optical fiber portion 35 and through the light diffuser 25 to illuminate the personal space of the passenger 2.

A downlink communication is furthermore established between a modulated light signal transmitter 15 and the VLC transmitting and receiving device of the electronic device 3 of the passenger 2. Downlink modulated light signals 61, containing downlink data from the computer terminal 4, are transmitted from a second LED 20. The downlink modulated light signals 61 have a wavelength equal to 850 nm. The downlink modulated light signals 61 propagate through the second optical fiber portion 32, and are not blocked but are transmitted through the first dichroic filter 41 to propagate through the third optical fiber portion 33 (see transmittance curve 49 and reflectance curve 50).

The downlink modulated light signals 61 then propagate into the third optical fiber portion 33. The second dichroic filter 52 does not pass the downlink modulated light signals 61 into the fourth optical fiber portion 34 (see transmittance curve 54 and reflectance curve 55). The downlink modulated light signals 61 therefore propagate through the fifth optical fiber portion 35, are transmitted via the second end of the fifth fiber portion 35 and via the light diffuser 25, and are transmitted to the VLC transmit/receive device of the electronic device 3 of the passenger 2.

The electronic device 3 then acquires the downlink data.

An uplink communication is also established between the VLC transmitting and receiving device of the passenger's electronic device 3 and a modulated light signal receiver 16. Uplink modulated light signals 62, containing uplink data to the computer terminal 4, are transmitted by the VLC transmitting and receiving device. The uplink modulated light signals 62 have a wavelength equal to 950 nm. The uplink modulated light signals 62 are picked up by the light diffuser 25. The uplink modulated light signals 62 propagate into the fifth optical fiber portion 35 via the second end of the fifth optical fiber portion 35. The second dichroic filter 52 passes the uplink modulated light signals 62 into the fourth optical fiber portion 34. The uplink modulated light signals 62 thus propagate in transmission through the fourth optical fiber portion 34 and are picked up by the photodiode 21 of the modulated light signal receiver 16.

The modem 13 of the centralized communication module 7 then acquires the uplink data and transmits them to the computer terminal 4.

Figure 7:
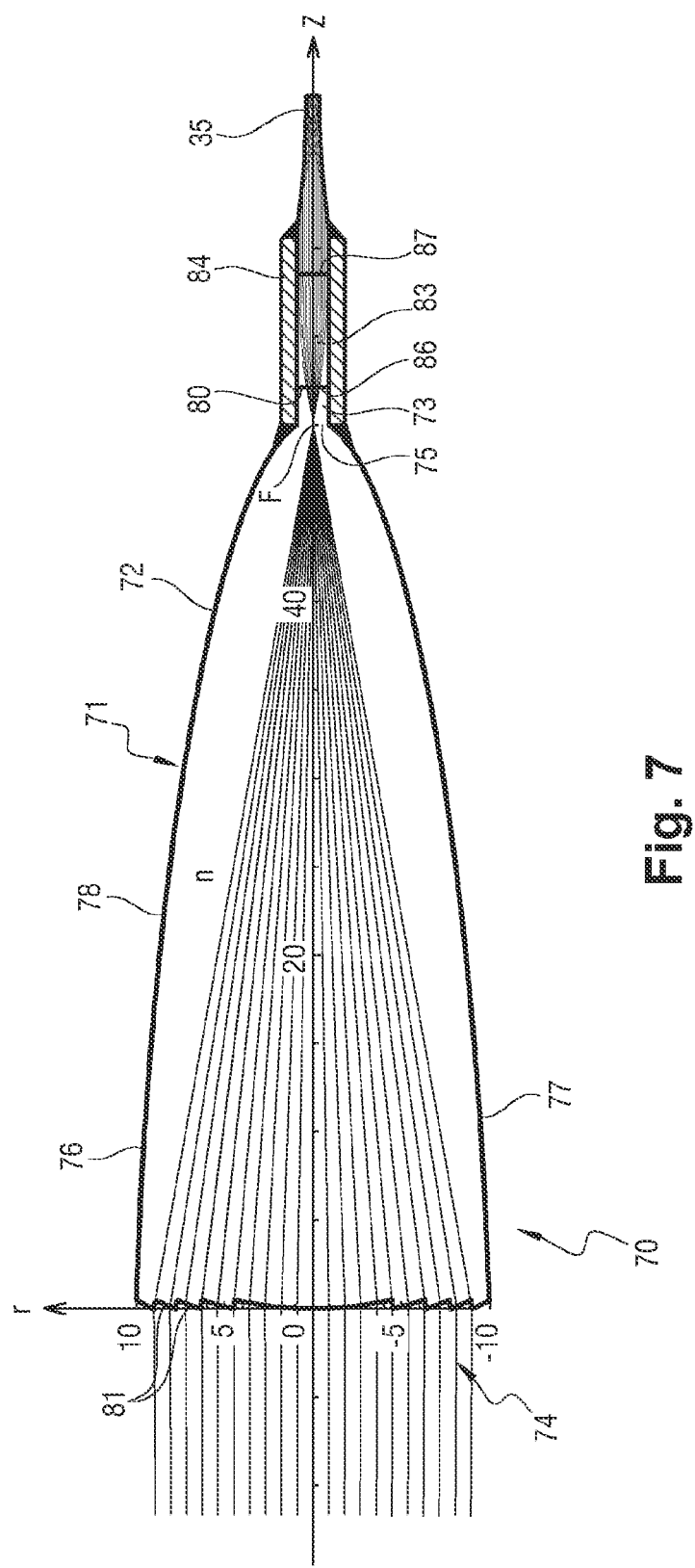
FIG. 7 shows a telescope of the communication system according to the first embodiment of the invention.

With reference to FIG. 7, a telescope 70 is positioned at a second end of the fifth optical fiber portion 35. The second end of the fifth optical fiber portion 35 will also be referred to as the "collecting end".

By "telescope" is meant here an optical instrument that forms, from an object located on one side of the telescope and at an infinite object distance from it, an image of the object located on the other side of the telescope and at an infinite image distance from it.

By "infinite object distance" and "infinite image distance" are meant here very large distances with respect to the diameter of the surface of the corresponding telescope face, i.e. typically more than 10 or 100 times a larger telescope diameter.

First, the telescope 70 includes an optical concentrator 71. The concentrator 71 is here a compound elliptical concentrator.

The concentrator 71 has an axis of revolution Z. The concentrator 71 includes a main portion 72 and a cylindrical portion 73.

The outer shape of the main portion 72 is defined by a lateral surface 78 that extends between an inlet face 74 and an outlet end 75.

The inlet face 74 of the concentrator 71 is also an inlet end of the telescope 70. The outlet end 75 is shaped like a disk. The inlet face 74 and the outlet end 75 extend perpendicular to the Z axis.

The area of the inlet face 74 is greater than the area of the outlet end 75.

The lateral surface 78 is defined, in a sectional plane passing through the Z axis, by a first elliptical arc 76 and by a second elliptical arc 77.

We note here that the concentrator 71 can be designed from any curved surface of the "unruled" type (i.e., not containing a straight line). This includes all so-called free surfaces, i.e. surfaces described by a curve at the vertex, by a conical constant, by non-zero deformation coefficients, and finally by a rotation angle. This angle of rotation is none other than the angle of rotation of the surface defined as the starting base surface of the optical design of the concentrator 71. The base surface is, for example, an ellipse of revolution, or any unruled surface. The angle of rotation thus characterizes any compound concentrator.

It should be noted that the lateral surface 78 of the main portion 72 of the concentrator 71 of the lighting system may have one or more lateral facets of the prismatic type.

The outlet end 75 opens into the cylindrical portion 73 which has a cross-sectional area equal to the area of the outlet end 75. An outlet face 80 of cylindrical portion 73 forms an outlet face 80 of concentrator 71. The area of the outlet face 80 of the concentrator 71 is smaller than the area of the inlet face 74 of the concentrator 71 and the telescope 70.

The inlet face 74 is now described.

It would be possible to provide that the inlet face 74 has a surface defined by a Cartesian oval.

In the cylindrical reference frame (r, Z(r)), this Cartesian oval would have the equation:

$$z_a(r) = \frac{c_a r^2}{1 + \sqrt{1 - (1 + K_a)(c_a r)^2}} + \sum_{j=2}^{7} A_{2j} r^{2j},$$

where $C_a$ is the curvature at the vertex of the Cartesian oval (also called vertex curvature), $K_a$ is a conic constant, and $A_{2j}$ are deformation coefficients. It is assumed that the inlet face 74 has a relative refractive index n and accepts light from a light source aligned on the optical axis at an object focal length $t_a$. The inlet face 74 then produces a diffraction-limited image (because the inlet face 74 does not introduce spherical aberration) at an image focal length $t'_a$.

The parameters of the Cartesian oval equation can be calculated using the recurrent variables:

$$m=n-1, p=n+1, U=nt_a-t'_a, \text{ and } V=2mt_a t'_a.$$

The curvature at the vertex $C_a$ is such that:

$$C_a=2U/V.$$

An example of a set of deformation coefficients $A_{2j}$ is provided in Appendix 1, at the end of this description.

An example of a set of characteristic polynomials $P_{2j}$, used in the definition of the deformation coefficients $A_{2j}$, is provided in Appendix 2 at the end of this description.

Here, however, as can be seen in FIG. 7, the inlet face 74 has a Fresnel surface, and thus acts as a Fresnel lens.

The Fresnel surface faces outward and has a plurality of areas 81 in the form of concentric annular sections centered on the Z axis. The concentric annular sections are defined by steps that extend outward from the inlet face 74.

The use of the Fresnel surface reduces the volume of the inlet face 74 of the telescope 70 (and thus the volume and mass of the telescope 70).

The Fresnel surface is defined by a piecewise function, each piece corresponding to an area 81 having the shape of a concentric annular section centered on the Z axis.

Each piece has a surface defined by a Cartesian oval.

The Fresnel surface used here does not introduce any spherical aberration, which allows the incident light rays to be perfectly concentrated at the image focus of the Fresnel lens constituted by the inlet face 74. The image focus F is located at the center of the outlet end 75 of the main portion 72 of the concentrator 71.

To define the Fresnel surface, a definition method is implemented comprising the following steps:

Step 1:
We define a height h for each piece (h can vary or be constant);

Step 2:
We define the diameter d of the surface of the piece;

Step 3:
We initialize a piece counter=1 (each piece is associated to a distinct value of i);

Step 4:
As long as the abscissa $r_s(i) \leq d/2$, the definition method progresses;

Step 5:
We define the piece i using the equation:

$$z_a(r) = (1-i)h + \frac{c_a r^2}{1 + \sqrt{1 - (1+K_a)(c_a r)^2}} + \sum_{j=2}^{7} A_{2j} r^{2j}$$

The parameters are identical to those used earlier for the Cartesian oval, except that the object focal length to and the image focal length $t'_a$ are compensated:

$$t_a = t_a - (i-1)h,$$

$$t'_a = t'_a + (i-1)h.$$

We thus obtain $z_a$ which depends on the following parameters:

$$z_a[n, t_a-(i-1)h, t'_a+(i-1)h, K_a, r_c].$$

Step 6:
The positive abscissa $r_c[i]$ of the string, which corresponds to a height h in the interval $\{0, d/2\}$, is calculated numerically using the function:

$$\text{FindRoot}[(1-i)h + z_a[n, t_a-(i-1)h, t'_a+(i-1)h, K_a, r_c] = h;$$

Step 7:
We define, for the following piece i+1:

$$t_a = t_a - ih,$$

$$t'_a = t'_a + ih;$$

Step 8:
We define the next piece i using the previous equations while considering the compensated offset (i.e. translation), as well as the compensated distances at the maximum diameter.

$$z_a[i+1] = \{-ih + z_a[n, t_a-ih, t'_a+ih, K_a, r],$$

($r>-d/2$ and $r=-r_c[i]$) or ($r<d/2$ and $r>=r_c[i]$)};

Step 9:
We then redefine the domain for the previous sector.

($r>-rc[i]$ and $r=r_c[1-i]$) or ($r<r_c[i]$ and $r>=r_c[i-1]$);

Step 10:
The piece is added to the function:

Rule=Append [fresnel, piece_$z_a$[i]];

Step 11:
The piece counter is then incremented: i=i+1;

Step 12:
The loop is closed, and the definition method returns to step 4,

Step 13:
The last piece is added:

Rule=Append [fresnel, piece_$z_a$[i]].

Step 14:
We then perform the correction of the riser of the Fresnel lens. For this, we follow the direction of the emerging rays using ray tracing.

An example of a set of parameters and implementation of an algorithm associated with the definition method is provided in Appendix 3, at the end of this description.

The concentrator 71 and the Fresnel lens formed by the Fresnel surface of the inlet face 74, thus form a monolithic assembly.

The telescope 70 further includes a gradient-index lens 83. The gradient-index lens 83 is arranged coaxially with respect to the concentrator 71 along the Z axis. The gradient-index lens 83 is made of a material whose refractive index changes in a radial, axial direction, or in aspherical way.

The gradient-index lens 83 has a cylindrical shape equal in cross-section to the cylindrical portion 73. The gradient-index lens 83 extends from the outlet face 80 of the concentrator 71.

The gradient-index lens 83 has an inlet face 86 that extends opposite the outlet face 80 of the concentrator 71.

The inlet face 86 of the gradient-index lens 83 is positioned against the outlet face 80 of the concentrator 71 and is bonded to the outlet face 80. The adhesive used has a refractive index similar to the material used to make the concentrator 71 and the gradient-index lens 83.

The telescope 70, including the gradient-index lens 83 and the concentrator 71, thus forms a monolithic assembly.

The second end of the fifth optical fiber portion 35 here has a cross-section equal to that of the gradient-index lens 83. The second end of the fifth optical fiber portion 35 opens facing the outlet face 87 of the telescope 70. The second end of the fifth optical fiber portion 35 is coupled to the outlet face 87 of the telescope 70, which is also an outlet face 87 of the gradient-index lens 83, The coupling here uses an APC connector, but another type of connector could be used. The coupling could be accomplished in a different manner, such as by bonding.

A ferrule 84 extends around the cylindrical portion 73, the gradient-index lens 83, and a short length of the second end of the fifth optical fiber portion 35. The ferrule 84 consolidates the attachment of the concentrator 71 the gradient-index lens 83, and the second end of the fifth optical fiber portion 35 to each other.

The operation of the telescope 70 is now described.

As can be seen in FIG. 1, the telescope 70 extends vertically into the light diffuser 25, so that the inlet face 74 of the telescope 70 opens to the exterior of the lighting and communication system, facing the personal space of the passenger 2.

The telescope 70 firstly has the advantages of the concentrator 71 and the Fresnel lens formed by the Fresnel surface of the inlet face 74. The telescope 70 thus allows the collection of incident light rays with a large acceptance angle. The acceptance angle here is equal to 34°. Incident light rays entering the concentrator 71 through the inlet face 74 are concentrated by reflection at the inner lateral surface of the main portion 72 of the compound elliptical concentrator 71.

If only a conventional optical concentrator were used, the incident light rays would be concentrated on an edge of the outlet end 75 of the main portion 72. With the use of the concentrator 71 described herein, the incident light rays are concentrated on the center of the outlet end 75, and then redistributed into the gradient-index lens 83 and throughout the cross-section of the second end of the fifth optical fiber portion 35.

The use of the telescope 70 thus optimizes the collection and concentration, in the second end of the fifth optical fiber portion 35, of incident light rays coming from outside the light diffuser 25 and thus, in particular, from the personal space of the passenger 2. The reception, by the lighting and communication system, of the uplink modulated light signals transmitted by the VLC transmission and reception device of the electronic device 3 of the passenger 2 and intended to be received by a modulated light signal receiver 16 is thus greatly improved.

Visible light and downlink modulated light signals propagate from the second end of the fifth optical fiber portion 35 into the personal space of the passenger 2 via the telescope 70.

Figure 8:
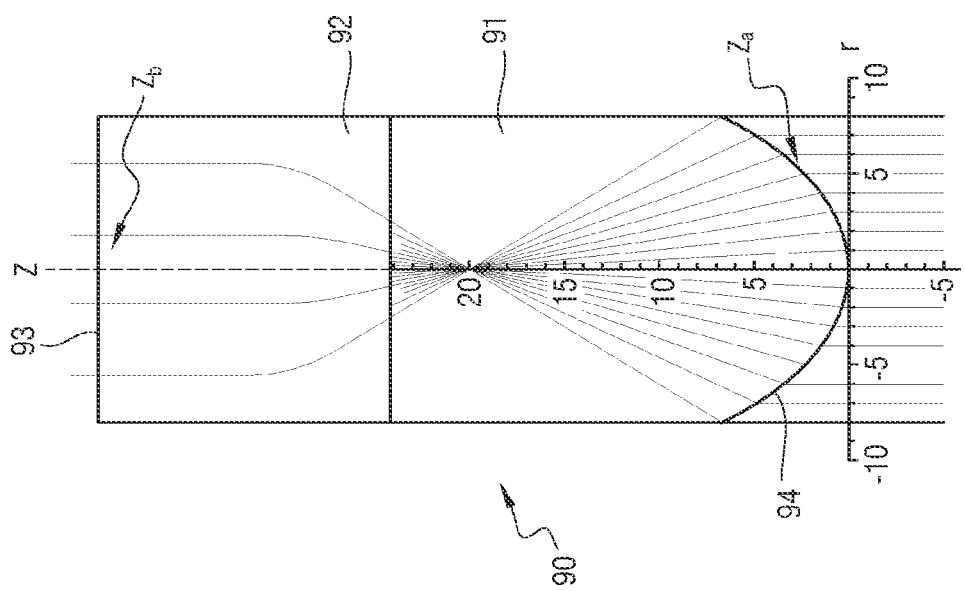
FIG. 8 shows a telescope of a communication system according to a second embodiment of the invention.

With reference to FIG. 8, a telescope 90 of a communication system according to a second embodiment of the invention includes an optical concentrator 91 and a gradient-index lens 92 too.

An inlet face of the gradient-index lens 92 is bonded to an outlet face of the optical concentrator 91. The optical concentrator 91 and the gradient-index lens 92 thus form a monolithic telescope 90. It is noted that the outlet face 93 of the gradient-index lens 92, which is also the outlet face of the telescope 90, is flat. This facilitates the coupling of the second end of the fifth optical fiber portion 35 to the outlet face 93.

The inlet face 94 of the optical concentrator 91 of the telescope 90 has a convex surface defined by the equation:

$$Z_a = \frac{n}{n+1}\left(-f_a + \sqrt{f_a^2 - \frac{n+1}{n-1}r^2}\right).$$

The outlet face 93 is defined by the equation:

$$Z_b = t = f_a + l, \text{ with } f_a, l > 0.$$

In these equations, fa is the image focal length of the lens formed by the convex surface of the inlet face 94, and n is the index of the material from which the optical concentrator 91 is made.

Figure 9:
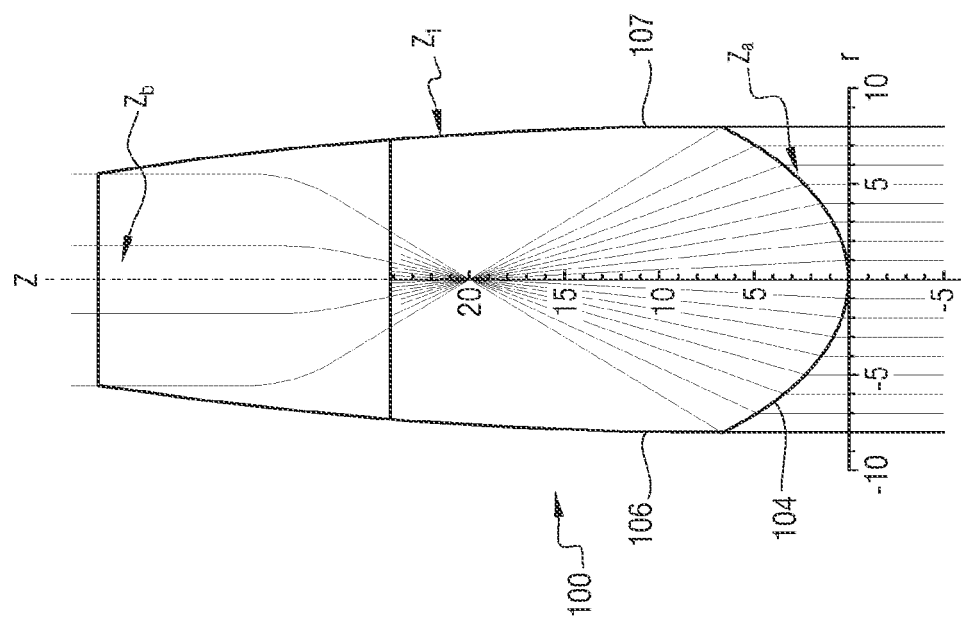
FIG. 9 shows a telescope of a communication system according to a third embodiment of the invention.

With reference to FIG. 9, a telescope 100 of a communication system according to a third embodiment of the invention is similar to that of the second embodiment, except that the lateral surface is defined, in a cross-sectional plane passing through the Z-axis, by a first elliptical arc 106 and by a second elliptical arc 107.

The internal lateral surface of the telescope allows to increase the acceptance angle. The internal lateral surface reflects completely the incident light rays.

The entrance face 104 of the optical concentrator 101 of the telescope 100 again has a convex surface defined by the equation:

$$Z_a = \frac{n}{n+1}\left(-f_a + \sqrt{f_a^2 - \frac{n+1}{n-1}r^2}\right).$$

The invention is not limited to the particular embodiments just described, but, on the contrary, covers any variant falling within the scope of the invention as defined by the claims.

Each lighting device, comprising a light diffuser and an optical fiber assembly, has been associated here with a modulated light signal transmitter and a modulated light signal receiver. It is also possible to have several transmitters and/or several receivers associated with the same lighting device, each transmitter and each receiver being positioned at one end of a portion of optical fiber of the optical fiber assembly. It is also possible to have a single transmitter and/or receiver connected to a plurality of lighting devices. The communication module may include a single or multiple communication channels. Any type of network can thus be implemented using any type of link and multiplexing configuration, and in particular MIMO (for Multiple Input Multiple Output) or MISO (for Multiple Input Single Output) type links.

It would have been possible to replace at least one of the two dichroic filters with a thin reflective layer made of a reflective material deposited in the corresponding connection area.

To build the telescope, any kind of optical concentrator can be used, and in particular a compound parabolic concentrator (or CPC), a coupled concentrator comprising a first concentrator integrated in a second concentrator, a solid or hollow concentrator, a Lens-walled type concentrator, etc.

The telescope could be a compound focal telescope, a compound afocal telescope, a monolithic focal telescope, a monolithic afocal telescope, etc.

An example of a monolithic afocal telescope is a telescope comprising a bi-elliptical and biconvex lens. The focal plane of such a telescope is located inside the monolithic block forming the telescope.

It has been indicated that the inlet face of the gradient-index lens extends opposite the outlet face of the optical concentrator. It is meant here either that the gradient-index lens is positioned against the outlet face of the optical concentrator, as is the case in this description, or that the gradient-index lens and the outlet face of the optical concentrator are separated only by an at least partially transparent element (another lens, some kind of attachment element, etc.). This is also the case between the receiving end of the optical fiber assembly and the outlet face of the gradient-index lens.

It has also been indicated that the inlet face of the telescope can have a surface defined by a Cartesian oval or a Fresnel surface. It would be possible to replace this inlet face with a corresponding lens, i.e. a lens with a surface defined by a Cartesian oval or a Fresnel lens, and to position this lens against the inlet face of the optical concentrator.

Annex 1

The deformation coefficients $A_{2j}$ are for example the following:

$$A_4(K_a) = \frac{mP_4 - U^3(1+K_a)}{V^3},$$

$$A_6(K_a) = 2\left(\frac{m^2 P_6 - U^5(1+K_a)^2}{V^5}\right),$$

$$A_8(K_a) = 5\left(\frac{m^3 P_8 - U^7(1+K_a)^3}{V^7}\right),$$

$$A_{10}(K_a) = 2\left(\frac{m^4 P_{10} - 7U^9(1+K_a)^4}{V^9}\right),$$

$$A_{12}(K_a) = 14\left(\frac{m^5 P_{12} - 3U^{11}(1+K_a)^5}{V^{11}}\right),$$

$$A_{14}(K_a) = 12\left(\frac{m^6 P_{14} - 11U^{13}(1+K_a)^6}{V^{13}}\right),$$

Annex 2

The characteristic polynomials $P_{2j}$ are for example the following:

$$P_4 = [n^2 t_a^3 + t_a'^3 + n(t_a + t_a')(t_a^2 - 3t_a t_a' + t_a'^2)],$$

$$P_6 = [np^2 t_a^5 - 3npt_a^4 t_a' - n(3n-1)t_a^3 t_a'^2 - n(n-3)t_a^2 t_a'^3 + 3npt_a t_a'^4 - p^2 t_a'^5],$$

$$P_8 = [np^3 t_a^7 - 4np^2 t_a^6 t_a' - 4nmpt_a^5 t_a'^2 - 2n\{n(n-4)-1\}t_a^4 t_a'^3 +$$
$$2n\{n(n+4)-1\}t_a^3 t_a'^4 + 4nmpt_a^2 t_a'^5 - 4np^2 t_a t_a'^6 + p^3 t_a'^7],$$

$$P_{10} = [7np^4 t_a^9 - 35np^3 t_a^8 t_a' - 5n(7n-11)p^2 t_a^7 t_a'^2 -$$
$$10n(2n^2 - 11 \times n + 1)pt_a^6 t_a'^3 + 2n(5n^3 + 63n^2 - 15n - 17)t_a^5 t_a'^4 +$$
$$2n(17 \times n^3 + 15n^2 - 63n - 5)t_a^4 t_a'^5 + 10n(n^2 - 11n + 2)pt_a^3 t_a'^6 -$$
$$5n(11n-7)p^2 t_a^2 t_a'^7 + 35np^3 t_a t_a'^8 - 7p^4 t_a'^9],$$

$$P_{12} = [3np^5 t_a^{11} - 18np^4 t_a^{10} t_a' - 2n(9n-19)p^3 t_a^9 t_a'^2 -$$
$$n(11n^2 - 76n + 25)p^2 t_a^8 t_a'^3 + 3nmp(n^2 + 30n + 5)t_a^7 t_a'^4 +$$
$$4n(4n^4 + 11n^3 - 35n^2 - 15n + 3)t_a^6 t_a'^5 +$$
$$4n(3n^4 - 15n^3 - 35n^2 + 11n + 4) \times t_a^5 t_a'^6 -$$
$$3nmp(5n^2 + 30n + 1)t_a^4 t_a'^7 - n(25n^2 - 76n + 11) \times p^2 t_a^3 t_a'^8 +$$
$$2n(19n-9)p^3 t_a^2 t_a'^9 - 18np^4 t_a t_a'^{10} + 3p^5 t_a'^{11}],$$

$$P_{14} = [11np^6 t_a^{13} - 77np^5 t_a^{12} t_a' - 7n(11n-29)p^4 t_a^{11} t_a'^2 -$$
$$7n(7n^2 - 58n + 31)p^3 t_a^{10} t_a'^3 + 7n(n^3 + 67n^2 - 93n + 1)p^2 t_a^9 t_a'^4 +$$
$$7n \times (9n^4 + 36n^3 - 162n^2 + 4n + 17)pt_a^8 t_a'^5 +$$
$$n(63n^5 - 225n^4 - 1330n^3 + 230n^2 + 595n + 27)t_a^7 t_a'^6 -$$
$$n(27n^5 + 595n^4 + 230n^3 - 1330n^2 - 225n + 63)t_a^6 t_a'^7 -$$
$$7n(17n^4 + 4n^3 - 162n^2 + 36n + 9)pt_a^5 t_a'^8 -$$
$$7n(n^3 - 93n^2 + 67n + 1)p^2 t_a^4 \times t_b^9 + 7n(31n^2 - 58n + 7)p^3 t_a^3 t_a'^{10} -$$
$$7n(29n - 11)p^4 t_a^2 t_a'^{11} + 77np^5 t_a t_a'^{12} - 11p^6 t_a'^{13}].$$

Annex 3

An example of embodiment of the method is as follows:

--- initial variables: ;
h=0,3; d=20; $t_a$=−1500; $t'_a$=70; n=1,7; $K_a$=0,47; fresnel={ };

-continued

```
r_c[0]=0; r_c[1]=0; i=1;
While[r_c[i]<=d/2,
** Calculation of the maximum radius of the string for a height h: **;
{r_c[i] = Replace[r with
FindRoot[(1−i)h+Za[n, t_a−(i−1) h, t'_a+(i−1)h, K_a ,r_c] = h,
{r, 0, d/2}]];
** Definition of the next piece i + 1 up to the maximum diameter.**;
** The object and image distances are compensated:**;
z_a [i+1]={−ih+z_a[n, t_a−ih, t'_a+ih, K_a, r],
(r >−d/2 and r = −r_c[i]) or ((r <d/2 and r>=r_c[i]))};
** Redefinition of the area of the previous sector:**;
piece__z_a[i]={(1−i)h + z_a [n, t_a −(i−1)h, t'_a+(i−1) h, K_a, r_c],
(r > − r_c [i] and r = r_c[1− i]) or ((r < r_c[i] and r >= r_c [i −1]))};
  Rule = Append [ fresnel, piece__Z_a[i] ];
  i++;
];
  Rule = Append [fresnel, piece__Z_a[i]];
Piecewise [fresnel]
```

The invention claimed is:

1. A communication system comprising an optical fiber assembly, a modulated light signal receiver and a telescope, the modulated light signal receiver being positioned at a receiving end of the optical fiber assembly, the telescope being positioned at a collecting end of the optical fiber assembly, the modulated light signal receiver being arranged to receive uplink modulated light signals collected by the telescope and travelling in the optical fiber assembly, the telescope comprising an optical concentrator having an inlet face and an outlet face with a surface area smaller than that of the inlet face, the telescope further comprising a gradient-index lens disposed with respect to the optical concentrator so that an inlet face of the gradient-index lens extends opposite the outlet face of the optical concentrator, the collecting end of the optical fiber assembly opening out opposite an outlet face of the gradient-index lens.

2. The communication system according to claim 1, wherein the inlet face of the optical concentrator has a Fresnel surface.

3. The communication system according to claim 2, wherein the Fresnel surface comprises a plurality of areas each having a surface defined by a Cartesian oval.

4. The communication system according to claim 1, wherein the inlet face of the optical concentrator has a surface defined by a Cartesian oval.

5. The communication system according to claim 1, wherein the optical concentrator is a compound elliptical concentrator.

6. The communication system according to claim 1, wherein a lateral surface of the concentrator has one or more lateral facets of the prismatic type.

7. The communication system according to claim 1, wherein the inlet face of the gradient-index lens is bonded to the outlet face of the optical concentrator.

8. The communication system according to claim 1, comprising a visible light transmitter positioned at an illumination end of the optical fiber assembly, the visible light transmitter being arranged to generate visible light that propagates through the optical fiber assembly to open outwardly via the collecting end and the telescope.

9. The communication system according to claim 1, comprising a modulated light signal transmitter positioned at a transmitting end of the optical fiber assembly, the modulated light signal transmitter being arranged to produce downlink modulated light signals which travel through the optical fiber assembly and are transmitted externally via the collecting end and the telescope.

* * * * *